Patented Sept. 24, 1940

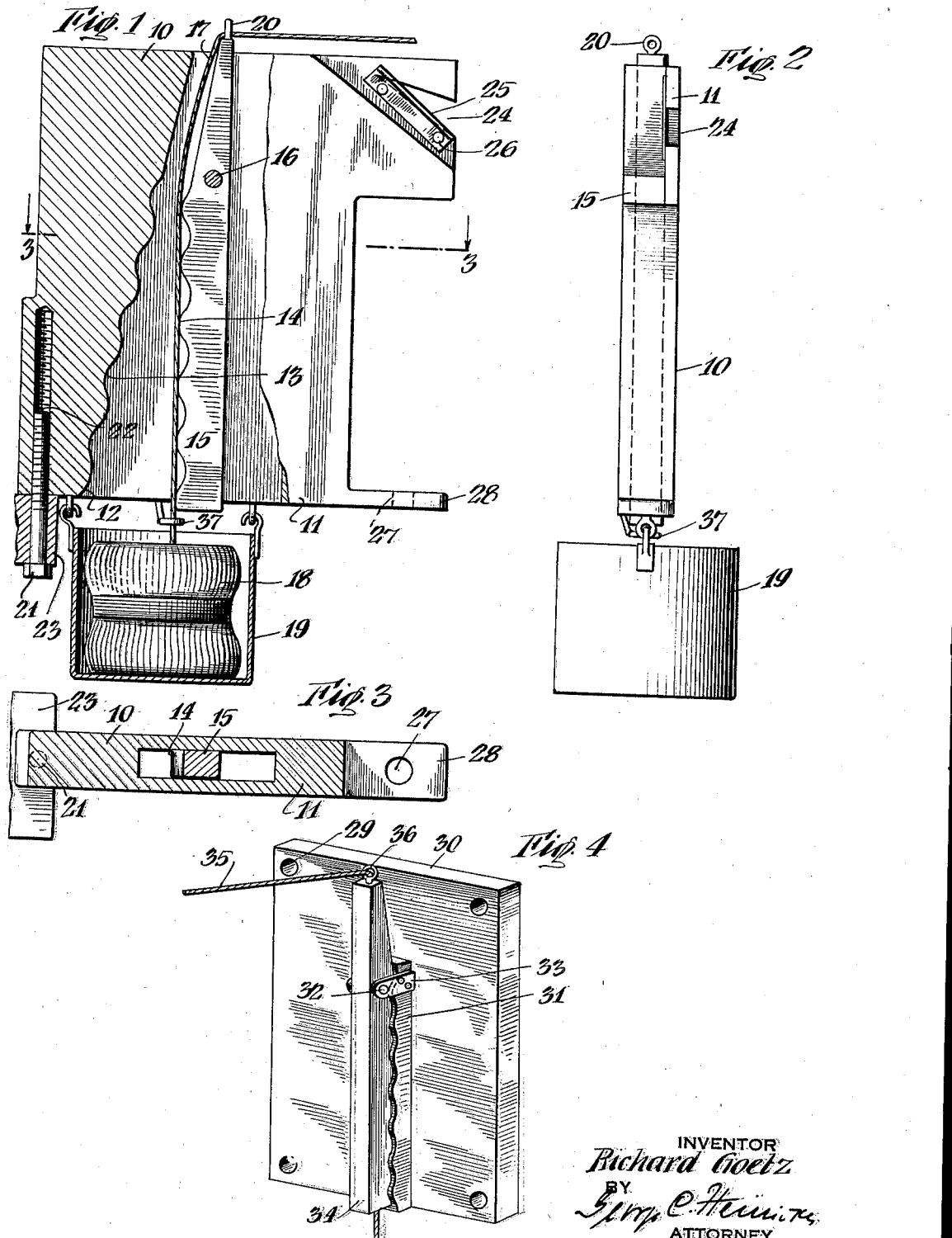

2,215,813

UNITED STATES PATENT OFFICE 2,215,813

CORD CUTTER

Richard Goetz, Brooklyn, N. Y.

Application September 16, 1937, Serial No. 164,175

2 Claims. (Cl. 30—127)

My invention relates to improvements in cord or string cutters useful for many purposes and in many trades, as for instance in the sausage making trade in which the ends of the sausages are tied with strings, because it necessitates the use of one hand only while the other hand holds the skin, and it is the principal object of my invention to provide a cord cutter in which any length of cord drawn from the supply roll or the like is automatically held for cutting.

Another object of my invention is the provision of a cord cutter which may be attached to a table, hung from a wall or be attached to the body of a workman, etc.

A further object of my invention is the provision of a cord cutter which is simple and inexpensive in its construction, yet durable and highly efficient in use.

A still further object of my invention is the provision of a cord cutter including a stationary and a movable corrugated member between which any length of cord is automatically held for cutting by a blade extending with its cutting edge into a suitable slot in the casing wall.

These and other objects and advantages of my invention will become more fully known as the description thereof proceeds, and will then be more specifically defined in the attached claims.

In the accompanying drawing forming a material part of this disclosure:

Fig. 1 is a side elevation of a cutter for cords or the like constructed according to my invention, one of the side walls being broken away to illustrate the interior construction.

Fig. 2 is an end view thereof.

Fig. 3 is a section on line 3—3 of Figure 1.

Fig. 4 is a perspective view of a modified form of cutter.

As illustrated in Figures 1 to 3, the cutter comprises a casing composed of two suitably connected walls 10 and 11. Within the casing, the wall 10 has formed therewith a stationary member 12 provided at its inner edge with a plurality of corrugations 13 adapted to be engaged by similar corrugations 14 of a movable member 15 pivoted near its upper end, as at 16, to the walls. The co-operating corrugations 13 and 14 operate to clamp the cord 17 when a length thereof is drawn from the casing and unwound from a supply roll 18 arranged within a suitable container 19 suspended from the casing in any convenient manner or otherwise disposed thereto.

The movable member 15 has secured at its upper edge a cord guide or eye 20, and a screw bolt 21 or the like entering a suitable opening in the casing, as at 22, serves to secure the apparatus to a table or other supports 23. The end or edge wall of the casing is slotted, as at 24, and the cutting edge 25 of a blade projects into this slot while the blade is secured in any suitable manner to the casing, as at 26.

In case the device is to be additionally secured to a support, this may be done by any suitable fastening means passed through the opening 27 in the tongue or projection 28.

As illustrated, the modified form of my apparatus is preferably used when hung by cords or the like passed through the openings 29 in plate 30, or by suitable bands passed through such holes in plate 30 may be secured to the body of a workman.

In this form of my invention the plate 30 carries a stationary corrugated member 31 to which is attached by means of the pivot pin 32 held in the member 33, a movable member 34 equipped on its inner face with corrugations co-operating with the corrugations of member 31, and the cord 35 is guided through an eye 36 or the like at the upper end of the movable member 34.

The device operates as follows:

When the apparatus is attached to a table or hung from a wall or suspended from the body of a workman, by any suitable means and a sufficient length of cord is drawn from the supply, a jerk or suitably directed pull on the cord will swing the movable member about its pivot pin and bring the corrugations thereof into engagement with the corrugations of the movable member to clamp the cord between them and to allow an introduction of the cord into the slot 24 and against the blade's cutting edge to be cut.

It will be clear that in this manner a great deal of cord, time and labor is saved, and the operation is so simple that anyone even a child will be able to operate the cutter without danger.

It will be understood that I have described and shown the preferred forms of my device as examples only of the many ways to practically construct the same, and that I may make such changes in its general arrangement and in the construction of the minor details thereof, as come within the scope of the appended claims without departure from the spirit of my invention.

The cord 17 is held against entangling by an eye 37 attached to the casing.

Having thus described my invention, what I claim as new and desire to secure by Letters Patent is:

1. In a cord cutter as described, a casing, a stationary corrugated member in said casing, and a movable corrugated member pivoted to said casing near its outer end, the corrugations of both members co-operating to brake a further dispensation of the cord after a certain length has been unwound from its supply, the casing wall having an inclined slot, and a cutter blade extending into said slot and arranged at the right of said corrugated clamping members for cutting the cord, a pull on said cord during the cutting thereof operating to move the movable clamping member into operating position, and a means to attach the cutter to a support.

2. In a cord-cutter as described, a casing having an obliquely disposed slot in one of its walls and a cutter blade extending with its cutting edge into said slot, said casing having one of its inner walls formed with a vertically disposed stationary member having a plurality of corrugations at its inner edge, a vertical movable member pivoted near its upper end between the casing walls and also having a plurality of corrugations formed at its inner edge co-operating with the corrugations of the stationary member to clamp the cord between the corrugations of both members when the desired length of cord has been pulled from a supply to be guided in said slot against the cutter, said cutter arranged to the right of said corrugated clamping members said cord to be cut by pulling it downward the pull on said cord while being cut operating to move the movable clamping member into operating position, and means to support said casing, and a cord container removably suspended from said casing.

RICHARD GOETZ.